US010607745B2

(12) United States Patent
Nakamura (10) Patent No.: US 10,607,745 B2
(45) Date of Patent: Mar. 31, 2020

(54) RADIOLOGICAL IMAGE CONVERSION SCREEN AND FLAT PANEL DETECTOR

(71) Applicant: MITSUBISHI CHEMICAL CORPORATION, Chiyoda-ku (JP)

(72) Inventor: Masaaki Nakamura, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/204,561

(22) Filed: Nov. 29, 2018

(65) Prior Publication Data

US 2019/0108924 A1 Apr. 11, 2019

Related U.S. Application Data

(63) Continuation of application No. PCT/JP2017/020293, filed on May 31, 2017.

(30) Foreign Application Priority Data

Jun. 1, 2016 (JP) .................................. 2016-110301

(51) Int. Cl.
*G21K 4/00* (2006.01)
*G01T 1/20* (2006.01)
(Continued)

(52) U.S. Cl.
CPC ................ *G21K 4/00* (2013.01); *C09K 11/02* (2013.01); *C09K 11/7771* (2013.01); *G01T 1/20* (2013.01);
(Continued)

(58) Field of Classification Search
None
See application file for complete search history.

(56) References Cited

U.S. PATENT DOCUMENTS 3,974,389 A * 8/1976 Ferri .................. C09K 11/7771
250/483.1
5,653,830 A 8/1997 Fleig et al.
(Continued)

FOREIGN PATENT DOCUMENTS

CN 101031980 A 9/2007
CN 102751427 A 10/2012
(Continued)

OTHER PUBLICATIONS

International Search Report dated Aug. 29, 2017, in PCT/JP2017/020293, filed May 31, 2017.
(Continued)

*Primary Examiner* — Edwin C Gunberg
(74) *Attorney, Agent, or Firm* — Oblon, McClelland, Maier & Neustadt, L.L.P.

(57) ABSTRACT

An object of the present invention is to provide a radiological image conversion screen where the flexibility and the storage stability of the radiological image conversion screen are sufficiently kept without phthalic acid ester while conventional sensitivity and sharpness being maintained, and another object thereof is to provide a radiological image conversion screen where a plasticizer in a phosphor layer is suppressed from volatilization and from transfer to other layers and/or films. The objects are solved by a radiological image conversion screen comprising a support substrate and a phosphor layer stacked on the support substrate, wherein the phosphor layer comprises phosphor particles, a polyvinyl acetal resin, and a carboxylic acid ester having an ether group.

12 Claims, 1 Drawing Sheet

(51) Int. Cl.
    *C09K 11/02*     (2006.01)
    *C09K 11/77*     (2006.01)

(52) U.S. Cl.
    CPC ........ *G01T 1/2018* (2013.01); *G21K 2004/06* (2013.01); *G21K 2004/08* (2013.01); *G21K 2004/12* (2013.01)

(56) References Cited

U.S. PATENT DOCUMENTS

| | | | |
|---|---|---|---|
| 6,927,404 | B2 | 8/2005 | Van den Bergh et al. |
| 2002/0186813 | A1* | 12/2002 | Tamura ................... H04N 5/321 378/98.8 |
| 2004/0229154 | A1 | 11/2004 | Shoji et al. |
| 2007/0246661 | A1* | 10/2007 | Hagiwara ........... C09K 11/7733 250/484.4 |
| 2012/0298876 | A1 | 11/2012 | Kaneko et al. |
| 2013/0267647 | A1* | 10/2013 | Tsujimoto ............. C08F 116/06 524/543 |
| 2017/0233609 | A1* | 8/2017 | Harada ..................... B32B 7/12 156/275.5 |

FOREIGN PATENT DOCUMENTS

| | | |
|---|---|---|
| CN | 104040373 A | 9/2014 |
| CN | 105283779 A | 1/2016 |
| EP | 0 820 069 A1 | 1/1998 |
| JP | 09-015395 A | 1/1997 |
| JP | 9-113698 A | 5/1997 |
| JP | 2001-330677 A | 11/2001 |
| JP | 2002-116300 A | 4/2002 |
| JP | 2002-277595 A | 9/2002 |
| JP | 2004-028986 A | 1/2004 |
| JP | 2004-346110 A | 12/2004 |
| JP | 2006-071470 A | 3/2006 |
| JP | 2007-024713 A | 2/2007 |
| JP | 2007-248283 A | 9/2007 |
| JP | 2007-292584 A | 11/2007 |
| JP | 2008-138152 A | 6/2008 |
| JP | 2013-015353 A | 1/2013 |
| WO | WO 2015/182524 A1 | 12/2015 |

OTHER PUBLICATIONS

Combined Office Action and Search Report dated Apr. 17, 2019 in Chinese Patent Application No. 201780033385.3, citing documents AA and AO-AS therein, 15 pages (with unedited computer generated English translation and English translation of categories of cited documents).

International Preliminary Report on Patentability and Written Opinion dated Dec. 13, 2018 in PCT/JP2017/020293 (submitting English translation only), 6 pages.

Office Action dated Mar. 29, 2019 in Korean Patent Application No. 10-2018-7035958, citing documents AO and AP therein, 9 pages (with unedited computer generated English translation).

Korean Office Action dated Jul. 23, 2019 in Korean Patent Application No. 10-2018-7035958 (with unedited computer generated English translation), 6 pages.

Office Action dated Oct. 11, 2019, in Chinese Patent Application No. 201780033385.3 filed, May 31, 2017 (with English Translation).

Office Action dated Dec. 5. 2019, in Korean Patent Application No. 10-2018-7035958, filed May 31, 2017 (with English Translation).

Office Action dated Jan. 6, 2020, in Chinese Patent Application No. 201780033385.3, filed May 31, 2017 (with English Translation).

\* cited by examiner

RADIOLOGICAL IMAGE CONVERSION SCREEN AND FLAT PANEL DETECTOR

CROSS-REFERENCE TO RELATED APPLICATION

This is a continuation of International Application PCT/JP2017/020293, filed on May 31, 2017, and designated the U.S., and claims priority from Japanese Patent Application 2016-110301 which was filed on Jun. 1, 2016, the entire contents of which are incorporated herein by reference.

TECHNICAL FIELD

The present invention relates to a radiological image conversion screen and a flat panel detector.

BACKGROUND ART

X-Ray images using films have been conventionally widely used in clinical practice. However, X-ray images using films provide analog image information, and therefore are not sufficient in resolution and are also not favorable in storage properties. In recent years, digital systems such as computed radiography (CR) and flat panel type radiation detectors (flat panel detectors: FPDs) have been developed.

In indirect FPDs for converting radiation into visible light, radiological image conversion screens are used for converting radiation into visible light. Such a radiological image conversion screen includes a phosphor for X-ray, such as thallium-activated cesium iodide (CsI:Tl) or terbium-activated gadolinium oxysulfide ($Gd_2O_2S:Tb$) (GOS), and the phosphor for X-ray emits visible light according to irradiated X-ray and the light emitted is converted into an electric signal by a photodetector provided with TFT, CCD, and the like, thereby resulting in conversion of X-ray information into digital image information.

FPDs are demanded to be higher in sensitivity to X-ray radiated and higher in sharpness. While it is effective to increase the amount of a phosphor in a radiological image conversion screen in order to improve the sensitivity, the amount of the phosphor is increased, thereby causing an increase in the thickness of the radiological image conversion screen and causing visible light emitted from the phosphor to be more easily diffused, resulting in a reduction in sharpness. In order to suppress the influence of such light diffusion and enhance sensitivity with sharpness being kept, for example, Patent Literature 1 discloses a method where the average particle size, the filling rate, the thickness, and the like of a phosphor is adjusted.

PRIOR ART DOCUMENT

Patent Literature

Patent Literature 1: JP 2007-248283 A

SUMMARY OF INVENTION

Technical Problem

However, in the method of Patent Literature 1, a radiological image conversion screen may be insufficient in terms of sufficiently keeping the flexibility and the storage stability thereof while sensitivity and sharpness being maintained, in some cases. Furthermore, there has been recently demanded a radiological image conversion screen not containing any phthalic acid ester as a plasticizer from the viewpoint of a low effect on the human body and the environment.

The present invention has been made in view of the above, and an object thereof is to provide a radiological image conversion screen where the flexibility and the storage stability (flexibility in the case where the radiological image conversion screen is stored at high temperatures for a long period) of the radiological image conversion screen are sufficiently kept without phthalic acid ester while conventional sensitivity and sharpness being maintained. Another object of the present invention is to provide a radiological image conversion screen where a plasticizer in a phosphor layer is suppressed from volatilization and from transfer to other layers and/or films. Still another object of the present invention is to provide a highly functional flat panel detector comprising the radiological image conversion screen and a photodetector.

Solution to Problem

The present inventors have made intensive studies, and as a result, have found that the above objects can be solved by a radiological image conversion screen configured to include a specified layer, thereby leading to the present invention.

The present invention includes a first aspect, a second aspect and a third aspect.

The first aspect of the present invention provides a radiological image conversion screen comprising a support substrate and a phosphor layer stacked on the support substrate, wherein the phosphor layer comprises phosphor particles, a polyvinyl acetal resin, and a carboxylic acid ester having an ether group.

In the radiological image conversion screen, the molecular weight of the carboxylic acid ester having the ether group is preferably 500 or less.

In the radiological image conversion screen, the carboxylic acid ester having the ether group is preferably bis(2-butoxyethyl) adipate or benzoic acid glycol ester.

In the radiological image conversion screen, the polyvinyl acetal resin is preferably a polyvinyl butyral resin.

In the radiological image conversion screen, the average molecular weight of the polyvinyl acetal resin is preferably 10000 or more and 150000 or less.

In the radiological image conversion screen, the phosphor layer preferably further comprises a urethane resin.

In the radiological image conversion screen, the average molecular weight of the urethane resin is preferably 10000 or more and 150000 or less.

In the radiological image conversion screen, the phosphor preferably corresponds to one or more phosphors selected from a group consisting of a GOS phosphor, a rare earth tantalum-based composite oxide phosphor, and a CsI phosphor.

The second aspect of the present invention provides a radiological image conversion screen comprising a support substrate and a phosphor layer stacked on the support substrate, wherein the phosphor layer comprises phosphor particles, a resin which is soluble in a solvent having an SP value of 10 $(cal/cm^3)^{1/2}$ or more, and a carboxylic acid ester having an ether group.

The third aspect of the present invention provides a flat panel detector comprising the radiological image conversion screen according to the first or the second aspect, and a photodetector.

Advantageous Effects of Invention

The present invention can provide a radiological image conversion screen where the flexibility and the storage stability of the radiological image conversion screen are sufficiently kept without phthalic acid ester while conventional sensitivity and sharpness being maintained. Furthermore, the present invention can provide a radiological image conversion screen where a plasticizer in a phosphor layer is suppressed from volatilization and from transfer to other layers and/or films. The present invention can also provide a highly functional flat panel detector comprising the radiological image conversion screen and a photodetector.

DESCRIPTION OF EMBODIMENTS

Figure 1:
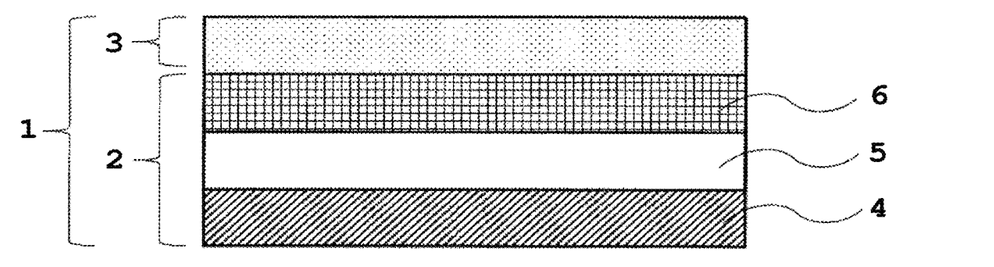
The FIGURE is a cross-sectional view schematically illustrating a configuration of a flat panel detector comprising a radiological image conversion screen according to one embodiment of the first and the second aspects of the present invention.

Hereinafter, the present invention will be described with reference to embodiments and examples, but the present invention is not intended to be limited to the following embodiments and examples, and can be optionally modified and carried out without departing from the spirit of the present invention.

Herein, the numerical range expressed by the wording " . . . to . . . " means the range encompassing the former numerical value and the latter numerical value described in the wording " . . . to . . . " as the lower limit and the upper limit, respectively.

Hereinafter, preferable configurations of the radiological image conversion screen and the flat panel detector (hereinafter, sometimes referred to as "FPD".) according to the present invention will be described with reference to the FIGURE, but the present invention is not limited thereto.

<First Aspect and Second Aspect>

The first aspect of the present invention provides a radiological image conversion screen comprising a support substrate and a phosphor layer stacked on the support substrate, wherein the phosphor layer comprises phosphor particles, a polyvinyl acetal resin, and a carboxylic acid ester having an ether group.

The second aspect of the present invention provides a radiological image conversion screen comprising a support substrate and a phosphor layer stacked on the support substrate, wherein the phosphor layer comprises phosphor particles, a resin which is soluble in a solvent having an SP value of 10 $(cal/cm^3)^{1/2}$ or more, and a carboxylic acid ester having an ether group.

A flat panel detector 1 comprises a radiological image conversion screen 2, a photodetector 3, and a power source section (not illustrated). The radiological image conversion screen 2 absorbs the energy of incident radiation such as X-ray, and then emits electromagnetic waves having wavelengths in the range of 300 nm or more and 800 nm or less, namely, electromagnetic waves (light) having wavelengths in the range, centering around visible light, from ultraviolet to infrared light.

The radiological image conversion screen 2 comprises a support substrate 4 and a phosphor layer 5 stacked on the support substrate 4.

The flat panel detector 1 is formed by allowing the photodetector 3 to adhere or closely adhere to a light-emitting surface of the radiological image conversion screen 2. The flat panel detector 1 may include a protective layer 6 between the light-emitting surface of the radiological image conversion screen 2 and the photodetector 3, and the protective layer 6 may be formed of a single layer or a plurality of layers. The light emitted from the radiological image conversion screen 2 reaches the photodetector 3 and then is subjected to photoelectric conversion to output power.

Hereinafter, each constituent member will be described.

[Support Substrate]

As the support substrate on which the phosphor layer is to be stacked, for example, a resin such as cellulose acetate, cellulose propionate, cellulose acetate butyrate, polyester such as polyethylene terephthalate, polystyrene, polymethacrylate, polyamide, a vinyl chloride-vinyl acetate copolymer, and polycarbonate, the resin in which a filler such as $TiO_2$ or $Al_2O_3$ is dispersed; paper, and aluminum are used.

The reflectance of a surface of the support substrate, on which the phosphor layer is to be stacked, is usually 80% or more, preferably 90% or more.

The thickness of the support substrate is not particularly limited, and it is usually 10 μm or more, preferably 50 μm or more, and usually 500 μm or less, preferably 400 μm or less, more preferably 300 μm or less, further preferably 250 μm or less.

[Phosphor Layer]

The phosphor layer for the first aspect of the present invention comprises phosphor particles, a polyvinyl acetal resin, and a carboxylic acid ester having an ether group.

The phosphor layer for the second aspect of the present invention comprises phosphor particles, a resin which is soluble in a solvent having an SP value of 10 or more, and a carboxylic acid ester having an ether group.

(Phosphor Particles)

The phosphor particles in each of the first and the second aspects of the present invention are particles of a phosphor which absorbs the energy of incident radiation such as X-ray and then emits electromagnetic waves having wavelengths in the range of 300 nm or more and 800 nm or less, namely, electromagnetic waves (light) having wavelengths in the range, centering around visible light, from ultraviolet to infrared light.

The type of the phosphor is not particularly limited as long as the effects of the first and the second aspects of the present invention are not impaired, and the phosphor is preferably high in conversion efficiency from X-ray to visible light and preferably hardly absorbs the visible light emitted.

For example, a gadolinium oxysulfide phosphor $(Gd_2O_2S)$ in which an activating substance such as terbium (Tb), dysprosium (Dy), cesium (Ce) or praseodymium (Pr) is contained (hereinafter, also collectively referred to as "GOS phosphor"), described in JP 2000-162394 A and JP 2003-82347 A, can be used.

A rare earth tantalum-based composite oxide phosphor, for example, a rare earth tantalum-based composite oxide phosphor represented by the compositional formula $(L_{1-n}Tb_n)_2O_3 \cdot xTa_2O_5 \cdot yB_2O_3 \cdot zNaF$ (wherein L represents at least one element selected from Y, La, Gd, and Lu, and n, x and y satisfy $5 \times 10^{-4} \leq n \leq 0.1$, $0.95 \leq x \leq 1.05$, $0 \leq y \leq 5.0$ and $0 < z \leq 0.52$, respectively.) described in JP H02-47185 A may also be used.

A phosphor, for example, CsI or CsI mixed with sodium iodide (NaI) at any molar ratio described in JP 2011-074352 A, or a phosphor containing an activating substance such as indium (In), thallium (Tl), lithium (Li), potassium (K), rubidium (Rb) or sodium (Na) with CsI (hereinafter, also collectively referred to as "CsI phosphor"), described in JP 2001-59899 A, may also be used.

The phosphor in each of the first and the second aspects of the present invention may be used singly or in combination of two or more thereof, and preferably corresponds to one or more phosphors selected from the group consisting of a GOS phosphor, a rare earth tantalum-based composite oxide phosphor, and a CsI phosphor.

The average particle size of the phosphor contained in the phosphor layer is usually 30 μm or less, preferably 15 μm or less, and usually 0.05 μm or more, preferably 0.1 μm or more. The average particle size is the average particle size on a volume basis, and is defined as the particle size (d50) at which the relative amount of particles on a volume basis is 50% when the particle size distribution (cumulative distribution) is determined by subjecting a sample to measurement with a particle size distribution measuring apparatus according to a laser diffraction-scattering method as a measurement principle. The average particle size can be measured using a laser particle size meter.

The average particle size falling within the above range is preferable in that the effect of scattering light is highly exerted and the resulting radiological image conversion screen is favorable in sensitivity.

(Binder Resin)

The resin (binder resin) contained in the phosphor layer in each of the first and the second aspects of the present invention may be any material as long as such any material can allow the phosphor particles to be dispersed and allow such a dispersion state to be favorably maintained in the usage environment of an X-ray detector, and furthermore such any material can form the radiological image conversion screen according to each of the first and the second aspects of the present invention.

The average molecular weight of the binder resin is preferably 10000 or more, more preferably 20000 or more, and on the other hand, is preferably 150000 or less, more preferably 100000 or less. An average molecular weight of more than 100000 causes the viscosity of a slurry to be so high that productivity in formation of the phosphor layer is decreased. An average molecular weight of less than 10000 causes the strength of the phosphor layer formed to be decreased. The average molecular weight of the binder resin can be measured by, for example, GPC.

The binder resin in the first aspect of the present invention is a polyvinyl acetal resin. The polyvinyl acetal resin is favorable in compatibility with the carboxylic acid ester having the ether group, and has suitable optical characteristics for the radiological image conversion screen. Examples of the polyvinyl acetal resin preferably include a polyvinyl butyral resin, a polyvinyl propylal resin, a polyvinyl ethylal resin and a polyvinyl methylal resin, and a polyvinyl butyral resin, among them, is particularly preferable from the viewpoint of the strength and the flexibility of the resin.

The phosphor layer in the first aspect preferably contains not only the polyvinyl acetal resin, but also one or more selected from the group consisting of a urethane resin, soluble nitrocellulose (nitrocellulose), cellulose acetate, ethyl cellulose, cotton-like polyester, polyvinyl acetate, vinylidene chloride-vinyl chloride polymer, vinyl chloride-vinyl acetate copolymer, polyalkyl (meth)acrylate, polycarbonate, cellulose acetate butyrate, polyvinyl alcohol, an acrylic resin, and gelatin; polysaccharide such as dextrin, and gum arabic, in the binder resin.

Among them, a urethane resin is preferable because the plasticity, the transparency, and the like of the phosphor layer, and the sensitivity and the sharpness of the radiological image conversion screen can be improved.

The content of the polyvinyl acetal resin based on the total amount of the binder resin and the plasticizer is not particularly limited, and is usually 50% by mass or more, preferably 60% by mass or more, more preferably 70% by mass or more, and the upper limit thereof is less than 100% by mass.

The content falling within the above range can allow the flexibility and the storage stability of the radiological image conversion screen to be sufficiently kept.

The content of the binder resin other than the polyvinyl acetal resin based on the total amount of the binder resin and the plasticizer is not particularly limited, and is usually 50% by mass or less, preferably 40% by mass or less, more preferably 20% by mass or less, particularly preferably 10% by mass or less, and usually 0% by mass or more.

The content falling within the above range can allow the flexibility and the storage stability of the radiological image conversion screen to be sufficiently kept.

The binder resin in the second aspect of the present invention is a resin which is soluble in a solvent having an SP value of 10 $(cal/cm^3)^{1/2}$ or more. The resin which is soluble in a solvent having an SP value of 10 $(cal/cm^3)^{1/2}$ or more refers to a resin which, when added in an amount of 5% by weight to a solvent having an SP value of 10 $(cal/cm^3)^{1/2}$ or more, selected from the group consisting of 2-butanol (10.8 $(cal/cm^3)^{1/2}$), isopropyl alcohol (11.5 $(cal/cm^3)^{1/2}$), n-octanol (10.3 $(cal/cm^3)^{1/2}$), tert-butanol (10.6 $(cal/cm^3)^{1/2}$), cyclohexanol (11.4 $(cal/cm^3)^{1/2}$), n-butanol (11.4 $(cal/cm^3)^{1/2}$), and n-propyl alcohol (11.9 $(cal/cm^3)^{1/2}$), is completely dissolved at 25° C.

Herein, whether or not the resin is completely dissolved in the solvent is visually determined.

(Plasticizer)

The plasticizer in each of the first and the second aspects of the present invention is a carboxylic acid ester having an ether group. The carboxylic acid ester having the ether group is high in polarity and therefore high in compatibility with the binder resin, and also contributes to improvements in the plasticity, the transparency, and the like of the phosphor layer, and the sensitivity and the sharpness of the radiological image conversion screen. The carboxylic acid ester having the ether group is preferably a polyfunctional carboxylic acid ester, particularly preferably a dicarboxylic acid ester.

The molecular weight of the carboxylic acid ester having the ether group is preferably 500 or less, more preferably 450 or less, further preferably 400 or less. The lower limit is not limited, and is preferably 50 or more, more preferably 100 or more, further preferably 200 or more, particularly preferably 300 or more. A molecular weight of more than 500 may cause the compatibility of the carboxylic acid ester having the ether group with the binder resin to be decreased in some cases.

The carboxylic acid ester having the ether group is preferably low in volatility. The reason for this is because the carboxylic acid ester having the ether group may be volatized in storage of the radiological image conversion screen, thereby causing lack of plasticity of the phosphor layer, resulting in a decrease in storage stability in some cases.

Examples of the carboxylic acid ester having the ether group include bis(2-butoxyethyl) adipate, benzoic acid glycol ester, and polyether ester. Among them, bis(2-butoxyethyl) adipate or benzoic acid glycol ester is preferable.

The content of the plasticizer based on the total amount of the binder resin and the plasticizer is not particularly limited, and is usually 0.1% by mass or more, preferably 1% by mass or more, more preferably 5% by mass or more, further preferably 10% by mass or more, and usually 50% by mass or less, preferably 40% by mass or less, more preferably 30% by mass or less.

The content falling within the above range can allow the flexibility and the storage stability of the radiological image conversion screen to be sufficiently kept.

(Filling Rate of Phosphor Particles (% by volume))

The filling rate of the phosphor particles in the phosphor layer in each of the first and the second aspects of the present invention is usually 40% by volume or more, preferably 50% by volume or more, further preferably 60% by volume or more, and usually 100% by volume or less.

The filling rate falling within the above range is preferable in that incident X-ray can be efficiently converted into visible light.

Herein, the method of measuring the filling rate is conducted as follows.

The weight of the support substrate before coating ($W_0$) and the weight of the support substrate after the phosphor layer is formed thereon ($W_1$) are measured. The thickness and the area of the layer formed, including the phosphor particles, and the measured weight of the layer ($W_1$-$W_0$) are used to calculate the weight per unit volume.

On the other hand, the weight per unit volume of the phosphor contained in the layer is calculated from the weight ratio between the phosphor and a medium. The content per unit volume of the phosphor, calculated, and the specific gravity of the phosphor can be used to calculate the filling rate of the phosphor particles (% by volume).

(Amount of Phosphor Stacked in Phosphor Layer)

The amount of the phosphor stacked in the phosphor layer in each of the first and the second aspects of the present invention is not particularly limited, and can be appropriately set depending on the size and the sensitivity demanded of the radiological image conversion screen. The phosphor particles are preferably stacked to form the phosphor layer, and the amount thereof is usually 20 mg/cm$^2$ or more, preferably 30 mg/cm$^2$ or more, more preferably 40 mg/cm$^2$ or more, further preferably 50 mg/cm$^2$ or more, particularly preferably 60 mg/cm$^2$ or more, and usually 1000 mg/cm$^2$ or less, preferably 500 mg/cm$^2$ or less.

In the case of use of high-energy radiation, the amount of the phosphor stacked is preferably 150 mg/cm$^2$ or more and 300 mg/cm$^2$ or less.

[Method of Forming Phosphor Layer]

The method of forming the phosphor layer in each of the first and the second aspects of the present invention is not particularly limited, and examples include a method of forming such a layer by a vacuum vapor deposition method and a method of forming such a layer by a wet film formation method.

Hereinafter, the method of forming the phosphor layer by a wet film formation method by use of a phosphor-containing composition containing the phosphor particles, the resin (binder resin) for dispersing the phosphor particles therein, and the carboxylic acid ester having the ether group will be described in detail.

In the case of formation of such a phosphor layer by a wet film formation method, a process for such formation usually includes a phosphor-containing composition preparation step, a coating step, and a drying step. The process may include a post treatment step (step of performing washing, drying, and the like) after the drying step.

(Phosphor-Containing Composition Preparation Step)

In the phosphor-containing composition preparation step, a phosphor-containing composition including the phosphor particles, the resin (binder resin), and the carboxylic acid ester having the ether group is prepared. The phosphor-containing composition may be in the form of a powder or slurry.

The phosphor-containing composition includes the phosphor particles, the resin (binder resin), and the carboxylic acid ester having the ether group, and may contain, if necessary, other medium such as a dispersant, a photopolymerization initiator/thermal polymerization initiator and the like. The composition may include an organic solvent or the like in order to adjust the viscosity of the composition.

The content of the binder resin included in the phosphor-containing composition is usually 0.1% by weight or more, preferably 2.0% by weight or more, and usually 20% by weight or less, preferably 10% by weight or less, based on the total amount of the phosphor-containing composition.

The dispersant that may be contained in the phosphor-containing composition is not particularly limited as long as the effects of the first and the second aspects of the present invention are not impaired, and examples include phthalic acid and stearic acid. The dispersant may be used singly or in combination of two or more different kinds thereof.

The organic solvent that may be contained in the phosphor-containing composition is not particularly limited as long as the organic solvent can dissolve or disperse the phosphor and the medium, and examples include ethanol, methyl ethyl ether, butyl acetate, ethyl acetate, ethyl ether, xylene, toluene, 2-butanol, isopropyl alcohol, and methyl ethyl ketone. The organic solvent may be used singly or in combination of two or more different kinds thereof.

The refractive index of the medium is preferably 1.3 or less, further preferably 1.1 or less in that a larger difference in refractive index between the phosphor and the medium allows a higher light-scattering effect in the phosphor particles, and allows the light emitted from the phosphor to be more easily collected to a depressed portion.

The phosphor-containing composition can be prepared by appropriately mixing and stirring the above raw material including the phosphor.

(Coating Step and Drying Step)

In the coating step, the support substrate is coated with the phosphor-containing composition prepared, thereby forming a coating film.

The method of forming the coating film by coating is not particularly limited as long as the effects of the first and the second aspects of the present invention are not impaired, and a known technique can be applied. Examples include a die coating method, a screen printing method, an inkjet method, and a spin coating method.

In the drying step, the coating film formed in the coating step can be dried or thermally cured by using a hot plate, a hot air dryer, or the like, or photo-cured by using an ultraviolet irradiation apparatus or the like, thereby obtaining the phosphor layer.

The phosphor layer may be formed of a multilayer obtained by stacking two or more layers which are the same as or different from each other. In the case of the multilayer, for example, layers can be appropriately stacked which are different in the average particle size and the particle size distribution of the phosphor, the medium contained, and the like.

[Protective Layer]

The radiological image conversion screen according to each of the first and the second aspects of the present invention may each include a protective layer. For example, the protective layer may be included between the phosphor layer and the support substrate, or between the light-emitting surface of the radiological image conversion screen and a photodetector, or the protective layer may be formed of a single layer or a plurality of layers.

The material forming the protective layer is not particularly limited as long as the effects of the first and the second aspects of the present invention are not impaired, and examples include a cured product of a radiation-curable composition containing urethane (meth)acrylate, monofunctional (meth)acrylate, or polyfunctional (meth)acrylate, and a polyethylene terephthalate (PET) film having a pressure-sensitive adhesive layer. The radiation-curable composition may appropriately contain, if necessary, any material other than the above.

The method of coating with the protective layer is not particularly limited as long as the effects of the first and the second aspects of the present invention are not impaired, and a known technique can be applied. Examples include a die coating method, a screen printing method, an inkjet method, and a spin coating method. A drying step, a post-treatment step (washing, drying), and the like may be optionally included after applying the material for forming the protective layer.

The thickness of the protective layer is not particularly limited as long as the effects of the first and the second aspects of the present invention are not impaired, and the thickness is usually 0.01 µm or more, preferably 1 µm or more, further preferably 2 µm or more. On the other hand, the thickness is usually 20 µm or less, preferably 9 µm or less, more preferably 6 µm or less.

The thickness of the protective layer, falling within the above range, is preferable from the viewpoint of prevention of decreases in surface protection properties and sharpness.

[Adhesive Layer]

The radiological image conversion screen according to each of the first and the second aspects of the present invention may each include an adhesive layer between respective layers (for example, between the support substrate and the protective layer, or between the phosphor layer and the protective layer).

The adhesive layer is not particularly limited in terms of the configuration thereof as long as the effects of the first and the second aspects of the present invention are not impaired.

The material forming the adhesive layer may be in any class of an aqueous dispersion type, a solution type, a reactive type, a hot-melt (heat-sensitive) type, and the like, and is preferably of an aqueous dispersion type or a solution type, particularly preferably of an aqueous dispersion type.

The adhesive layer preferably includes one or more resins, or preferably also includes a copolymer of a resin with other component. Examples of such a resin include a polyurethane resin, a styrene-butadiene copolymer, an acrylonitrile-butadiene copolymer, a polyester resin, a chloroprene resin, a silicone resin, and an epoxy resin. Among them, a polyurethane resin, a styrene-butadiene copolymer, an acrylonitrile-butadiene copolymer, and a polyester resin are preferable, and a polyurethane resin is particularly preferable, because adhesion, and optical characteristics (sensitivity and sharpness) of the radiological image conversion screen are improved.

The resin may be modified with, for example, a carboxyl group, a sulfonic acid group, or an amino group as long as the effects of the first and the second aspects of the present invention are not impaired, and hydrogen of such a functional group may be partially replaced with an alkali metal or an alkaline earth metal.

The adhesive layer may be formed of a single layer or a plurality of layers. For example, when a reflective film or the like is included between the support substrate and the phosphor layer, the adhesive layer may be configured from a polyurethane resin layer and a layer of a resin different from the polyurethane resin on the upper surface of the reflective film, or may be configured as a mixed adhesive layer made by preliminarily mixing a polyurethane resin with a resin different from the polyurethane resin.

The method of coating with the adhesive layer is not particularly limited as long as the effects of the first and the second aspects of the present invention are not impaired, and a known technique can be applied. Examples include a die coating method, a screen printing method, an inkjet method, and a spin coating method. A drying step, a post-treatment step (washing, drying), and the like may be optionally included after applying the adhesive.

The thickness of the adhesive layer is not particularly limited as long as the effects of the first and the second aspects of the present invention are not impaired, and the thickness is usually 0.1 µm or more, preferably 0.5 µm or more, further preferably 1 µm or more. On the other hand, the thickness is usually 100 µm or less, preferably 30 µm or less, more preferably 20 µm or less.

The thickness of the adhesive layer, falling within the above range, is preferable in that adhesion between an organic multilayer reflective film and the phosphor layer is favorable, and optical characteristics such as sensitivity and sharpness are favorable.

<2. Third Aspect>

The third aspect of the present invention provides a flat panel detector including the radiological image conversion screen according to the first or the second aspect, and a photodetector.

[Radiological image Conversion Screen]

The above description about the radiological image conversion screen according to the first or the second aspect is incorporated in the description about the radiological image conversion screen of the third aspect of the present invention.

[Photodetector]

The photodetector includes a photoelectric conversion section located facing the phosphor layer, and has a function of converting the fluorescence emitted from the phosphor layer into an electric signal or the like. The photodetector is not particularly limited in terms of the configuration as long as the photodetector has such a function, and a known photodetector can be appropriately used.

EXAMPLES

Hereinafter, the present invention will be more specifically described with reference to Examples, but the present invention is not intended to be limited to the following Examples without departing from the spirit thereof.

[Production of Radiological image Conversion Screen]

Production Example 1

Twenty parts by weight of a mixture, which was prepared by mixing a polyvinyl butyral resin (one of a polyvinyl acetal resin. An average molecular weight of which was 40000 to 60000) as a binder resin, a urethane resin as a binder resin, and bis(2-butoxyethyl) adipate (D931 manufactured by J-PLUS Co., Ltd.) (one of a carboxylic acid ester having an ether group) as a plasticizer at a ratio of 80:5:15, was dissolved in 80 parts by weight of a mixed solvent of toluene, 2-butanol, xylene, isopropyl alcohol and methyl ethyl ketone, and the solution was sufficiently stirred to prepare a binder. Thirteen parts by weight of the binder and 87 parts by weight of a Gd$_2$O$_2$S:Tb phosphor having an average particle size of 9 μm were mixed and sufficiently stirred, and the resulting mixture was further subjected to a dispersion treatment with a ball mill to obtain a "phosphor-containing composition 1".

Next, a white polyethylene terephthalate film being a light-reflective support having a thickness of 188 μm (Lumirror E-60 manufactured by Toray Industries, Inc.) as a support substrate was coated with the "phosphor-containing composition 1" by use of a blade coater so that the coating weight of the phosphor was 150 mg/cm$^2$ after drying, thereby forming a phosphor layer on the support substrate, followed by drying at a drying temperature set to 70° C. to 80° C. to form a phosphor layer. Then, a protective layer made of a non-light-scattering polyethylene terephthalate film having a thickness of 6 μm and coated with a heat-sensitive adhesive was attached to the surface of the phosphor layer. Thus, a radiological image conversion screen 1 of Experimental Example 1 was obtained.

The polyvinyl butyral resin was completely dissolved in isopropyl alcohol having an SP value of 11.5 (cal/cm$^3$)$^{1/2}$ at concentration of 5% by weight and at 25° C.

Production Example 2

A radiological image conversion screen 2 of Experimental Example 2 was obtained in the same manner as in Production Example 1 except that a benzoic acid glycol ester (JP120 manufactured by J-PLUS Co., Ltd.) was used as the plasticizer in Production Example 1.

Production Example 3

A radiological image conversion screen 3 of Experimental Example 3 was obtained in the same manner as in Production Example 1 except that dibutyl phthalate was used as the plasticizer in Production Example 1.

Production Example 4

A radiological image conversion screen 4 of Experimental Example 4 was obtained in the same manner as in Production Example 3 except that no urethane resin was used as the binder resin in Production Example 3.

Production Example 5

A radiological image conversion screen 5 of Experimental Example 5 was obtained in the same manner as in Production Example 1 except that dibutyl adipate was used as the plasticizer in Production Example 1.

Production Example 6

A radiological image conversion screen 6 of Experimental Example 6 was obtained in the same manner as in Production Example 1 except that dioctyl sebacate was used as the plasticizer in Production Example 1.

Production Example 7

A radiological image conversion screen 7 of Experimental Example 7 was obtained in the same manner as in Production Example 1 except that a cycloolefin polymer (ZEONEX 480R manufactured by Zeon Corporation) was used as the binder resin and only toluene was used as the solvent in Production Example 1.

The cycloolefin polymer was not dissolved in a solvent having an SP value of 10 (cal/cm$^3$)$^{1/2}$ or more at concentration of 5% by weight and at 25° C.

Reference Production Example 1

A radiological image conversion screen 8 of Reference Example 1 was obtained in the same manner as in Production Example 7 except that no plasticizer was used in Production Example 7.

[Measurement of Physical Properties of Radiological image Conversion Screen]

The evaluation results of the plasticity and the storage stability of each of the respective radiological image conversion screens obtained in Experimental Examples 1 to 7 and Reference Example 1 as described above, and the transparency of the phosphor layer thereof, and the volatility of the plasticizer contained in the phosphor layer are shown in Table 1.

TABLE 1

| | Binder resin | Plasticizer | Molecular weight of plasticizer | Plasticity | Transparency | Volatility | Storage stability |
|---|---|---|---|---|---|---|---|
| Production Example 1 | Poly(vinyl butyral) urethane | Bis(2-butoxyethyl) adipate | 346 | ◎ | ◎ | ◎ | ◎ |
| Production Example 2 | Poly(vinyl butyral) urethane | Benzoic acid glycol ester<br>Diethylene glycol dibenzoate<br>Dipropylene glycol dibenzoate | Mixture 327<br>314<br>342 | ○ | ◎ | ◎ | ○ |
| Production Example 3 | Poly(vinyl butyral) urethane | Dibutyl phthalate | 278 | ○ | ◎ | Δ | ○ |
| Production Example 4 | Poly(vinyl butyral) | Dibutyl phthalate | 278 | ○ | ◎ | Δ | ○ |
| Production Example 5 | Poly(vinyl butyral) urethane | Dibutyl adipate | 258 | ◎ | ◎ | X | X |
| Production Example 6 | Poly(vinyl butyral) urethane | Dioctyl sebacate | 371 | X | X | N.T. | N.T. |
| Production Example 7 | Cycloolefin polymer | Bis(2-butoxyethyl) adipate | 346 | X | X | N.T. | N.T. |
| Reference Production Example 1 | Cycloolefin polymer | — | — | X | ◎ | N.T. | N.T. |

In the Table, "NT" means no evaluation (Not Tested).

The evaluation criteria of each item is as follows.
<Plasticity>
The plasticity was evaluated by bending the radiological image conversion screen produced.
⊚: The radiological image conversion screen produced was high in flexibility, and was not cracked even when highly bent.
○: The radiological image conversion screen produced had flexibility, and was not cracked even when lightly bent.
x: The radiological image conversion screen produced was not plasticized and had no flexibility.
<Transparency>
The phosphor layer obtained by coating was visually evaluated. A decrease in the transparency of the phosphor layer leads to decreases in the sensitivity and the sharpness of the radiological image conversion screen.
⊚: The binder resin of the phosphor layer stacked on the substrate was high in transparency.
○: The binder resin of the phosphor layer stacked on the substrate had transparency, but the phosphor layer was slightly clouded.
x: The binder resin of the phosphor layer stacked on the substrate was poor in transparency, and the phosphor layer was clouded.
<Volatility>
The volatilization of the plasticizer and the plasticity of the phosphor layer in storage of the radiological image conversion screen comprising no protective layer at 60° C. were evaluated.
⊚: The plasticizer in the phosphor layer was not almost volatilized even when the radiological image conversion screen produced was stored at 60° C. for 200 hours.
○: The plasticizer in the phosphor layer was slightly volatilized when the radiological image conversion screen produced was stored at 60° C. for 200 hours.
Δ: The plasticizer in the phosphor layer was partially volatilized and the plasticity of the phosphor layer was slightly lost when the radiological image conversion screen produced was stored at 60° C. for 200 hours.
x: The plasticizer in the phosphor layer was volatilized and the plasticity of the phosphor layer was lost when the radiological image conversion screen produced was stored at 60° C. for 200 hours.
<Storage Stability>
⊚: Neither the change in plasticity nor the change in photography performance was observed even when the radiological image conversion screen produced was stored at 60° C. for 1 month.
○: A decrease in the plasticity was observed when the radiological image conversion screen produced was stored at 60° C. for 1 month.
x: The plasticity was lost when the radiological image conversion screen produced was stored at 60° C. for 1 month.

Furthermore, the radiological image conversion screens of each of Production Examples 1 to 3 was evaluated with respect to the sensitivity to X-ray radiated and the sharpness by use of an X-ray camera (Rad-icon manufactured by Teledyne Rad-icon Imaging Corp.).

The sensitivity and the sharpness were evaluated by determining the sensitivity when an image is taken with an X-ray having a tube voltage of 80 kV transmitted through a water phantom having a thickness of 10 cm and the MTF value at a spatial frequency of 2/mm relative to the sensitivity and the MTF value when the radiological image conversion screen of Experimental Example 3 is used, which are taken as 100 respectively, and then comparing them. The radiological image conversion screen of Experimental Example 3 was obtained using a phthalic acid ester plasticizer mostly widely used, and used as the evaluation standard.

As a result, the radiological image conversion screens of Experimental Examples 1 and 2 exhibited sensitivity and sharpness statistically equivalent to those of the radiological image conversion screen of Experimental Example 3. It was also indicated that the radiological image conversion screen of each of Experimental Examples 1 and 2 showed excellent rating of the volatility of the plasticizer compared to that in Experimental Example 3.

It is clear from the foregoing that the radiological image conversion screen according to each of the first and the second aspects of the present invention can sufficiently keep the flexibility and the storage stability of the radiological image conversion screen while conventional sensitivity and sharpness being maintained.

While the invention has been described in detail and with reference to specific embodiments thereof, it will be apparent to one skilled in the art that various changes and modifications can be made therein without departing from the spirit and scope thereof.

REFERENCE SIGNS LIST

1 flat panel detector
2 radiological image conversion screen
3 photodetector
4 support substrate
5 phosphor layer
6 protective layer

The invention claimed is:
1. A radiological image conversion screen, comprising a support substrate and a phosphor layer stacked on the support substrate,
wherein:
the phosphor layer comprises:
phosphor particles,
a polyvinyl acetal resin, and
a carboxylic acid ester having an ether group; and
the phosphor particles comprise at least one phosphor selected from the group consisting of:
a GOS phosphor,
a rare earth tantalum-based composite oxide phosphor, and
a CsI phosphor.
2. The radiological image conversion screen according to claim 1, wherein a molecular weight of the carboxylic acid ester having the ether group is 500 or less.
3. The radiological image conversion screen according to claim 1, wherein the carboxylic acid ester having the ether group is bis(2-butoxyethyl) adipate or benzoic acid glycol ester.
4. The radiological image conversion screen according to claim 1, wherein the polyvinyl acetal resin is a polyvinyl butyral resin.
5. The radiological image conversion screen according to claim 1, wherein an average molecular weight of the polyvinyl acetal resin is 10000 or more and 150000 or less.
6. The radiological image conversion screen according to claim 1, wherein the phosphor layer further comprises:
a urethane resin.
7. The radiological image conversion screen according to claim 6, wherein an average molecular weight of the urethane resin is 10000 or more and 150000 or less.

8. A flat panel detector, comprising:
the radiological image conversion screen according to claim 1; and
a photodetector.

9. The radiological image conversion screen according to claim 1, wherein a content of the carboxylic acid ester having the ether group based on a total amount of the polyvinyl acetal resin and the carboxylic acid ester having the ether group is 30% by mass or less.

10. The radiological image conversion screen according to claim 1, wherein the phosphor particles comprise at least one phosphor selected from the group consisting of:
a GOS phosphor represented by formula: $Gd_2O_2S$, and including at least one activating substance selected from the group consisting of Tb, Dy, Ce and Pr,
a rare earth tantalum-based composite oxide phosphor represented by formula:

$(L_{1-n}Tb_n)_2O_3 \cdot xTa_2O_5 \cdot yB_2O_3 \cdot zNaF$, where:
L represents at least one element selected from the group consisting of Y, La, Gd and Lu, and
n, x, y and z satisfy the following:
$5 \times 10^{-4} \leq n \leq 0.1$
$0.95 \leq x \leq 1.05$
$0 \leq y \leq 5.0$
$0 < z \leq 0.52$, and
a CsI phosphor optionally mixed with sodium iodide or at least one activating substance selected from the group consisting of In, Tl, Li, K, Rb and Na.

11. A radiological image conversion screen, comprising a support substrate and a phosphor layer stacked on the support substrate,
wherein:
the phosphor layer comprises:
phosphor particles,
a resin which is soluble in a solvent having an SP value of 10 $(cal/cm^3)^{1/2}$ or more, and
a carboxylic acid ester having an ether group; and
the phosphor particles comprise at least one phosphor selected from the group consisting of:
a GOS phosphor,
a rare earth tantalum-based composite oxide phosphor, and
a CsI phosphor.

12. The radiological image conversion screen according to claim 11, wherein the phosphor particles comprise at least one phosphor selected from the group consisting of:
a GOS phosphor represented by formula: $Gd_2O_2S$, and including at least one activating substance selected from the group consisting of Tb, Dy, Ce and Pr,
a rare earth tantalum-based composite oxide phosphor represented by formula:

$(L_{1-n}Tb_n)_2O_3 \cdot xTa_2O_5 \cdot yB_2O_3 \cdot zNaF$, where:
L represents at least one element selected from the group consisting of Y, La, Gd and Lu, and
n, x, y and z satisfy the following:
$5 \times 10^{-4} \leq n \leq 0.1$,
$0.95 \leq x \leq 1.05$,
$0 \leq y \leq 5.0$,
$0 < z \leq 0.52$, and
a CsI phosphor optionally mixed with sodium iodide or at least one activating substance selected from the group consisting of In, Tl, Li, K, Rb and Na.

* * * * *